US009016899B2

(12) United States Patent
Holland et al.

(10) Patent No.: US 9,016,899 B2
(45) Date of Patent: Apr. 28, 2015

(54) LUMINAIRE WITH MODULAR COOLING SYSTEM AND ASSOCIATED METHODS

(71) Applicant: Lighting Science Group Corporation, Satellite Beach, FL (US)

(72) Inventors: Eric Holland, Indian Harbour Beach, FL (US); Mark P. Boomgaarden, Satellite Beach, FL (US); Rick LeClair, Melbourne, FL (US)

(73) Assignee: Lighting Science Group Corporation, Melbourne, FL (US)

( * ) Notice: Subject to any disclaimer, the term of this patent is extended or adjusted under 35 U.S.C. 154(b) by 120 days.

(21) Appl. No.: 13/832,900

(22) Filed: Mar. 15, 2013

(65) Prior Publication Data

US 2014/0104834 A1    Apr. 17, 2014

Related U.S. Application Data

(60) Provisional application No. 61/715,075, filed on Oct. 17, 2012.

(51) Int. Cl.
  *F21V 29/00*    (2006.01)
  *B60Q 1/06*    (2006.01)
  *F21V 19/00*    (2006.01)
  (Continued)

(52) U.S. Cl.
CPC ........... *F21V 29/2206* (2013.01); *F21V 19/001* (2013.01); *B23P 15/26* (2013.01); *F21V 29/2268* (2013.01); *F28F 3/02* (2013.01); *F21K 9/13* (2013.01); *F21K 9/90* (2013.01); *F21V 29/2231* (2013.01); *F21K 9/135* (2013.01); *F21Y 2101/02* (2013.01); *F21Y 2103/022* (2013.01)

(58) Field of Classification Search
CPC .......... F21Y 2101/02; F21Y 2105/001; F21Y 2103/003; F21Y 2111/005; F21Y 2111/007; F21Y 2111/004; F21Y 2105/00; F21Y 2111/002; F21V 29/22; F21V 29/20; F21V 29/2268; F21V 29/002; F21V 19/0045; F21V 29/2293; F21V 29/2206; F21V 29/004; F21K 9/00; F21K 9/30; H01L 51/529; H01L 31/052; H01L 31/024; F21S 48/328; F21S 48/321; H05K 1/0203; H05K 2201/10598; F21L 15/06
USPC .................................................. 362/294, 373
See application file for complete search history.

(56) References Cited

U.S. PATENT DOCUMENTS

6,787,999 B2    9/2004    Stimac et al.
6,799,864 B2    10/2004   Bohler et al.
(Continued)

*Primary Examiner* — Donald Raleigh
(74) *Attorney, Agent, or Firm* — Mark R. Malek; William A. Harding; Widerman Malek, PL (57) ABSTRACT

A luminaire comprising a base, a heat sink modularly connected to the base, and a heat-generating element in thermal communication with the modular heat sink. The heat sink may include a heat-generating element contacting portion, and a plurality of heat sink segments connected to and extending outwardly therefrom. Each of the heat sink assemblies segments may comprise at least one fin assembly. Each heat sink segment may pass through a respective plurality of passageways in the top portion of the base so that the heat sink segments may matingly engage the medial portion of the base. A method for forming a heat sink comprises fabricating a heat-generating element contacting portion, constructing a plurality of heat sink segments, and assembling the plurality of heat sink segments to connect to and extend outwardly from the bottom surface of the heat-generating element contacting portion.

17 Claims, 8 Drawing Sheets

(51) Int. Cl.
  *B23P 15/26* (2006.01)
  *F28F 3/02* (2006.01)
  *F21K 99/00* (2010.01)
  *F21Y 101/02* (2006.01)
  *F21Y 103/02* (2006.01)

(56) References Cited

U.S. PATENT DOCUMENTS

| | | |
|---|---|---|
| D593,963 S | 6/2009 | Plonski et al. |
| 7,748,870 B2 | 7/2010 | Chang et al. |
| 7,762,315 B2 | 7/2010 | Shen |
| 7,824,075 B2 | 11/2010 | Maxik et al. |
| 7,922,356 B2 | 4/2011 | Maxik et al. |
| 7,923,748 B2 | 4/2011 | Ruffin |
| 8,021,019 B2 | 9/2011 | Chen et al. |
| 8,125,776 B2 | 2/2012 | Alexander et al. |
| 2008/0080188 A1* | 4/2008 | Wang .................. 362/294 |
| 2010/0177519 A1* | 7/2010 | Schlitz ................ 362/294 |
| 2012/0217861 A1 | 8/2012 | Soni |
| 2012/0230027 A1 | 9/2012 | Boomgaarden et al. |
| 2012/0268894 A1 | 10/2012 | Alexander et al. |
| 2013/0088871 A1* | 4/2013 | Yun et al. ............ 362/249.01 |
| 2014/0192537 A1* | 7/2014 | Chung et al. ......... 362/294 |

* cited by examiner

LUMINAIRE WITH MODULAR COOLING SYSTEM AND ASSOCIATED METHODS

RELATED APPLICATIONS

This application claims the benefit of U.S. Provisional Patent Application Ser. No. 61/715,075 filed on Oct. 17, 2012 and titled Lighting Device With Integrally Molded Cooling System and Associated Methods, the entire contents of which are incorporated herein by reference.

FIELD OF THE INVENTION

The present invention relates to the field of lighting devices and, more specifically, to the design and manufacture of modular cooling systems for luminaires, and associated methods.

BACKGROUND OF THE INVENTION

Digital lighting technologies such as light-emitting diodes (LEDs) offer significant advantages over incandescent and fluorescent lamps. These advantages include, but are not limited to, better lighting quality, longer operating life, and lower energy consumption. Consequently, LED-based lamps are increasingly being used to replace legacy light sources in conventional lighting fixtures. However, a number of design challenges and costs are associated with replacing traditional lamps with LED illumination devices. These design challenges include thermal management, installation ease, and manufacturing cost control.

When an LED operates in a high-temperature ambient environment and/or a space-limited enclosure, the heat generated by an LED and its attending circuitry can cause overheating and premature failure of the LED. Thermal management describes a system's ability to draw heat away from an LED. Passive cooling technology, such as a heat sink thermally coupled to a digital device, may be used to transfer heat from a solid material to a fluid medium such as, for example, air. To prevent overheating of the LED, a heat sink must be designed to absorb and dissipate heat at a sufficient rate with respect to the amount of heat being generated by the LED. If the heat sink does not have the optimal amount of capacity, the heat can gradually build up behind the LED and cause damage to the components.

Retrofitting legacy lighting systems with digital lighting technology also introduces installation challenges. Many LED-based lighting solution designs require replacement or reconfiguration of light fixtures that were originally designed to support incandescent or fluorescent lamps to instead support LEDs. For example, retrofitting a fluorescent light fixture with LED-based luminaires may require the costly and labor-intensive stripping of the fixture not only of its fluorescent lamps but also of its wireway cover and ballast(s).

The heat dissipation requirements of common digital lighting solutions, as well as the limitations imposed by legacy light fixture designs, also can add cost and complexity to lighting assembly manufacturing. For example, external heat sinks typically are exposed to the visibility of consumers and, therefore, are often painted during manufacturing for aesthetic purposes. Painting heat sinks adds material and manufacturing costs to the overall price of the lamp product. Furthermore, the addition of circuitry to cause an LED-based luminaire to mimic the operational characteristics of a legacy lighting device also adds material and manufacturing costs.

U.S. patent application Ser. No. 12/910,340 by Sagal discloses at least one LED mounted on the exterior side of an electronic circuit board, and a thermally conductive housing material overmolded onto a peripheral portion of the electronic circuit board to form a heat sink. Such a molding method is designed to deliver product consistency and reliability. This molding method may, however, be difficult to maintain when manufacturing lamps with a multi-component design due to the typically labor-intensive and error-prone conventional hand assembly or semi-automated assembly processes employed.

U.S. patent application Ser. No. 13/149,179 by Chuang discloses an LED light bulb comprising a light source baseboard securely coupled to a heat sink. The fins of the heat sink are externally exposed to the environment surrounding the bulb and extend substantially near the base of the bulb. Similarly, U.S. patent application Ser. No. 12/987,104 by Huang discloses an LED light bulb with all of its heat sink fins fully exposed to contact with external air. As described above, the disclosed heat sink solutions both use fins that occupy most available circumferential space projecting outward from the surface of the heat sink, leaving no room for auxiliary devices. Also, because external heat sinks of such a design are exposed to the visibility of consumers, the heat sinks are often painted during manufacturing for aesthetic purposes. Painting heat sinks adds material and manufacturing costs to the overall price of the lamp product.

U.S. patent application Ser. No. 12/649,631 by Ruffin discloses a heat sink for use with a high output LED light source. The heat sink comes into thermal contact with groups of outer vanes to increase the total heat dissipation surface area available to the light source. However, no thermal insulation exits between the fins of the heat sink and the LEDs to more effectively keep dissipated heat and ambient environment heat from reaching the LED light source.

Much of the heat generated by LEDs comes out the back of the lamp itself. Consequently, lamp designs like those described above, which feature heat sinks with fins extending toward the back of a lamp, suffer from unfavorable heat dissipation characteristics when used in a space-limited environment such as a can light fixture.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In view of the foregoing, it is therefore an object of the present invention to provide an improved LED-based luminaire for use as a legacy lamp retrofit in a space-limited lamp enclosure, such as a can light fixture. The LED-based luminaire may comprise a modular cooling system which, according to embodiments of the present invention, may advantageously position substantial portions of a heat sink external to a thermally insulated space containing an LED light source. The modular heat sink may also advantageously include heat sink segments positioned substantially closer to the open-air environment adjacent a space-limited lamp enclosure to achieve favorable heat dissipation characteristics. The present invention also may advantageously provide a cooling system for a digital lighting device that is inexpensive to manufacture, install, and operate.

These and other objects, features, and advantages according to the present invention are provided by a luminaire with a modular cooling system that may include a heat generating element, a modular heat sink in thermal contact with the heat generating element, and a base configured to receive the modular heat sink. The heat generating element may include one or more light emitting diodes (LEDs).

The modular heat sink may include a plurality of heat sink segments and a heat-generating element contacting portion, all of which may be made of a thermally conductive material. The heat sink segments may be connected to and may extend outwardly from a bottom surface of the heat-generating element contacting portion. Each of the heat sink segments may include at least one elongate-shaped fin assembly, each having a body portion and at least one fin extending outwardly from the body portion. For fin assembly configurations featuring multiple fins, a void may be defined between pairs of fins and the body portion. The heat-generating element contacting portion may include a substantially central aperture through which an electrical connector may pass to form an electrical connection with the LEDs.

The base may have a top portion that may include a plurality of passageways each formed to receive one of the heat sink segments. The fin assemblies of each of the heat sink segments may matingly engage a medial portion of the base. The heat sink segments may be sequentially spaced along a circumference of the heat-generating element contacting portion, and the medial portion of the base may include pairs of fin guards that may form respective channels within which the fin assemblies of each heat sink segment may be positioned.

The base may further comprise a substantially cylindrical walled core having an interior and an exterior. Each of the plurality of heat sink segments may be configured to engage the base. A proximal edge of each fin assembly may be positioned adjacent to the exterior of the walled core of the base. A distal edge of each fin assembly may be substantially exposed to the ambient environment along the circumference of the heat-generating element contacting portion. The modular heat sink may further comprise a power supply carried within the interior of the walled core.

The base may further comprise at least one auxiliary heat sink made of a thermally conductive material that may be fixedly attached to a portion of the base. When all auxiliary heat sinks are brought into thermal communication with the modular heat sink, a total heat sink surface area formed by the combination may be proportional to a thermal output of the heat-generating element.

A method aspect of the present invention is for fabricating a modular heat sink that may be included in the lighting device with the modular cooling system. The method may comprise fabricating a heat-generating element contacting portion, constructing a plurality of heat sink segments each having at least one fin assembly, and assembling the plurality of heat sink segments to connect to and extend outwardly from the bottom surface of the heat-generating element contacting portion. The method may also comprise configuring each fin assembly to define a void between a body portion and at least one pair of fins. The method may further comprise fixedly connecting the heat sink segments with the bottom surface of the heat-generating element contacting portion. The method may still further comprise integrally molding the plurality of heat sink segments with the bottom surface of the heat-generating element contacting portion. The method may also comprise positioning each of the plurality of heat sink segments such that the distal edges of the fin assemblies are disposed substantially along a circumference of the heat-generating element contacting portion, and sequentially spacing the plurality of heat sink segments in relation to one another along a circumference of the heat-generating element contacting portion. The method may further comprise constructing at least two of the heat sink segments to be identical in shape.

DETAILED DESCRIPTION OF THE PREFERRED EMBODIMENT

The present invention will now be described fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art will realize that the following embodiments of the present invention are only illustrative and are not intended to be limiting in any way. Other embodiments of the present invention will readily suggest themselves to such skilled persons having the benefit of this disclosure. Likewise, throughout this disclosure, the present invention may be referred to as relating to luminaires, digital lighting, and light-emitting diodes (LEDs). Those skilled in the art will appreciate that this terminology is only illustrative and does not affect the scope of the invention. For instance, the present invention may just as easily relate to lasers or other digital lighting technologies.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Referring now to FIGS. 1-4, a luminaire 100 that includes a modular cooling system 120 according to an embodiment of the present invention is now described in detail. Throughout this disclosure, the present invention may be referred to as a luminaire 100, a lighting system, an LED lighting system, a lamp system, a lamp, a device, a system, a product, and a method. Those skilled in the art will appreciate that this terminology is only illustrative and does not affect the scope of the invention.

Example methods and systems for digital lighting device with a modular cooling system are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

Figure 1A:
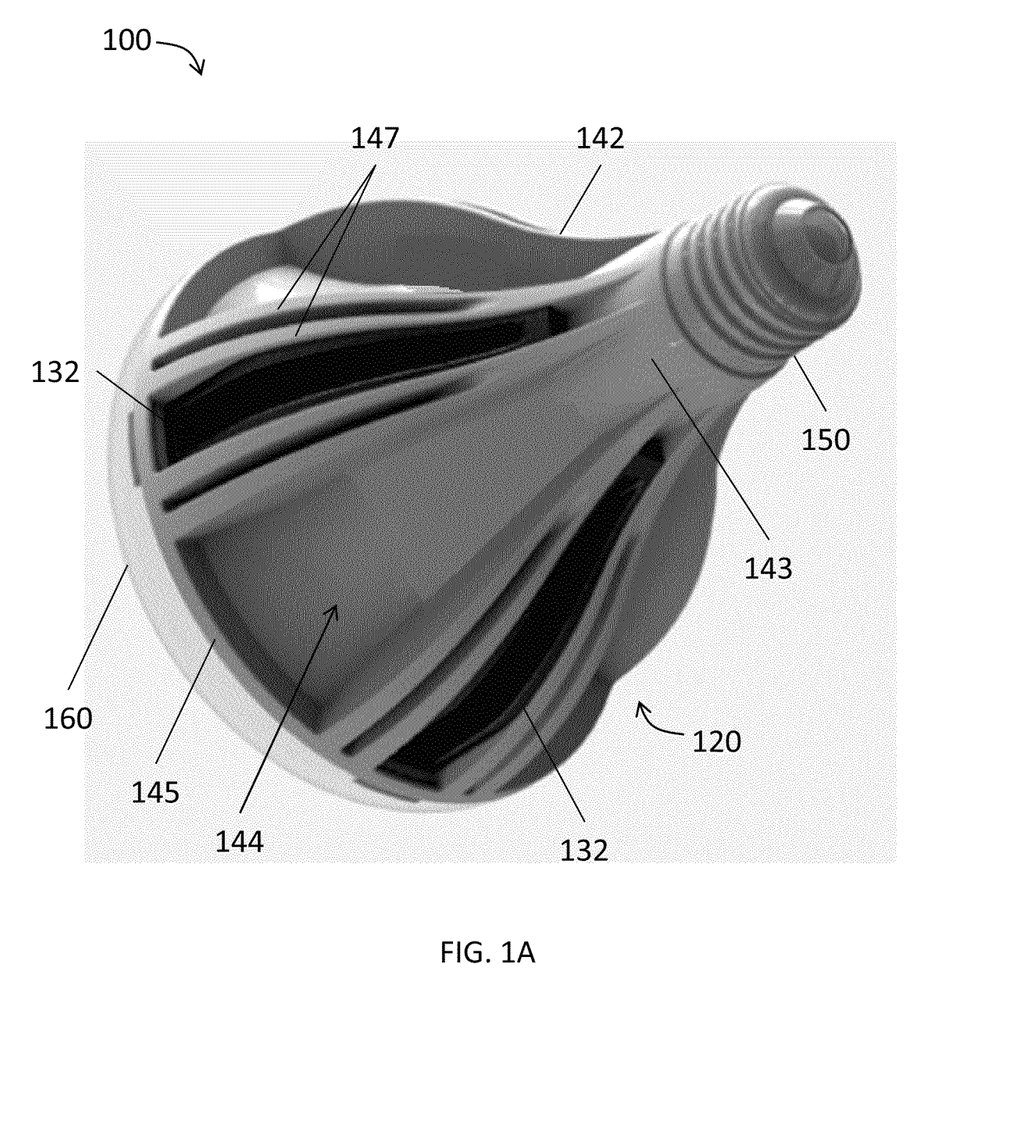
FIG. 1A is an assembled, perspective view of a luminaire having a modular cooling system according to an embodiment of the present invention.
Figure 1B:
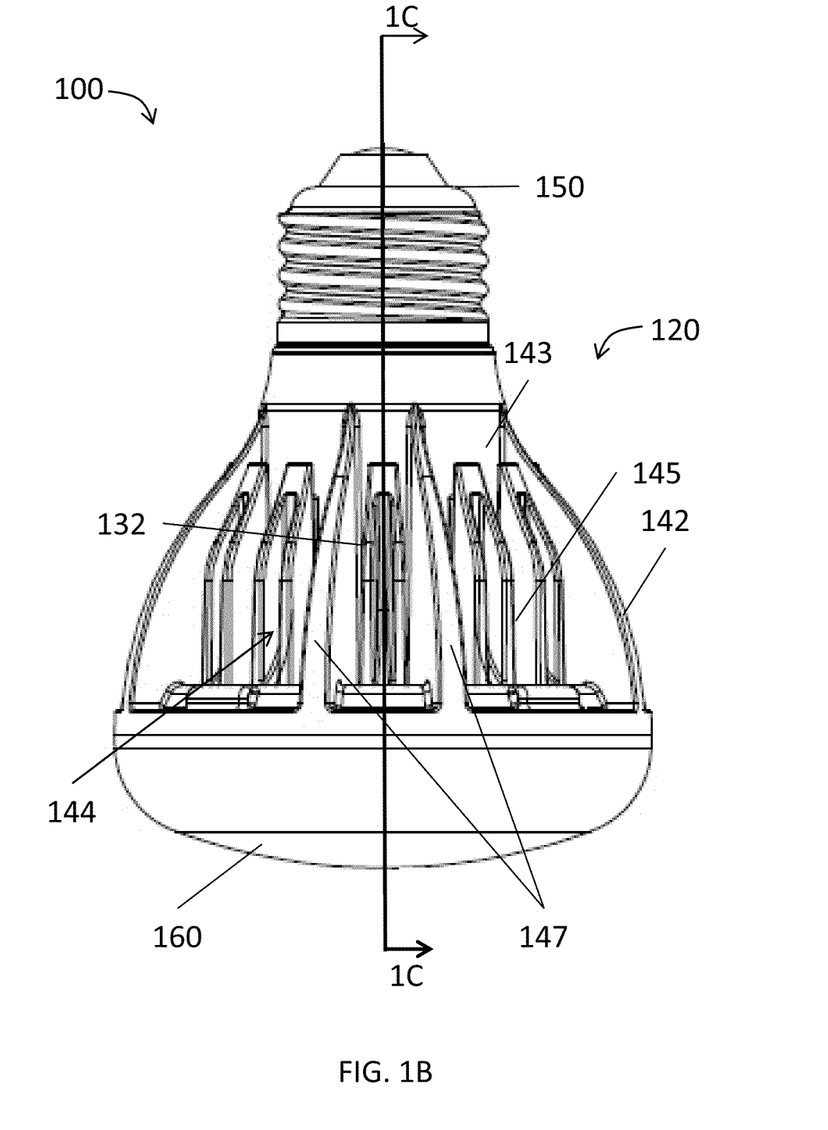
FIG. 1B is an assembled, front elevation view of the luminaire illustrated in FIG. 1A.
Figure 1C:
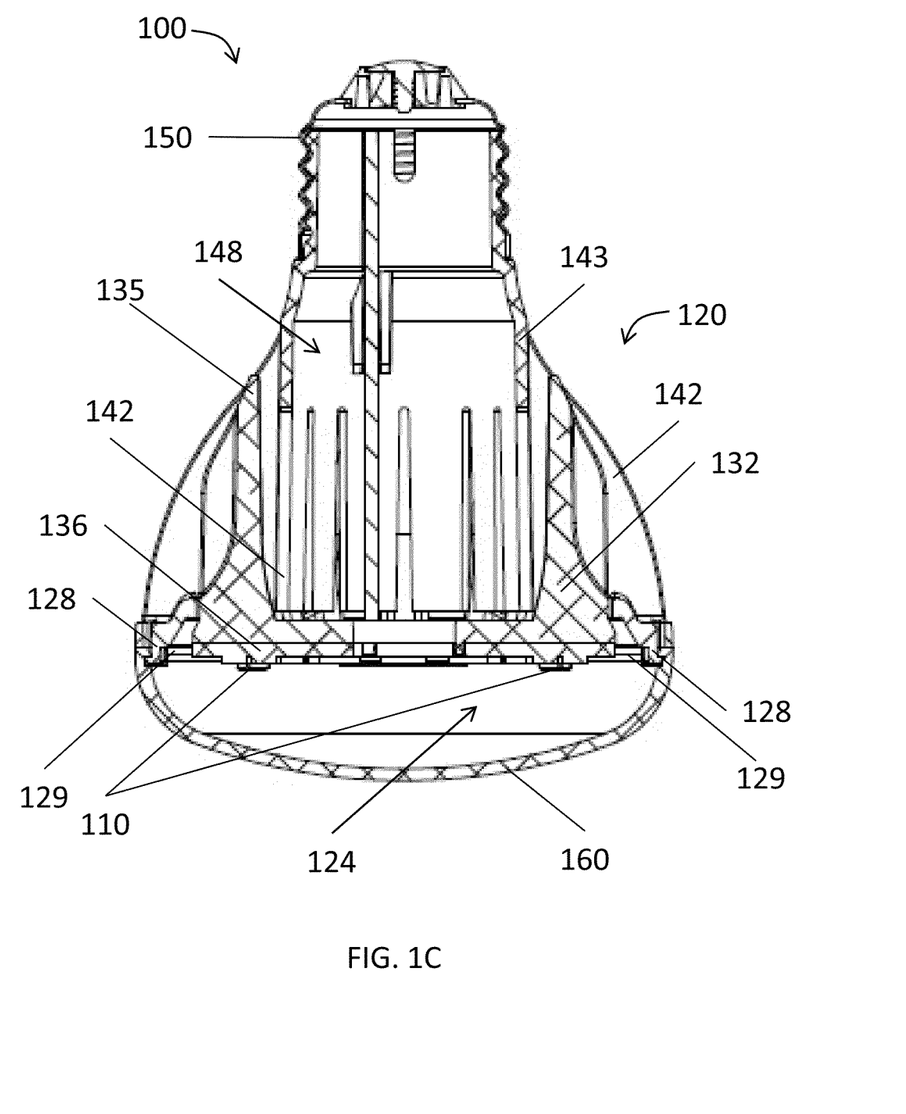
FIG. 1C is an assembled, cross sectional view of the luminaire illustrated in FIG. 1B and taken through line 1C-1C.

Referring now to FIGS. 1A, 1B, 1C, and 1D, a luminaire 100 including a modular cooling system 120 will now be discussed. Referring more specifically to FIG. 1C, the luminaire 100, according to an embodiment of the present invention, may include a heat generating element 110, a heat sink 132, a base 142, an Edison connector 150, and an optic 160. The heat generating element 110 may comprise a top surface and a bottom surface, and may be in the form of a light source. The components comprising the cooling system 120 (i.e., the light source 110, heat sink 132, and base 142) may be connected by any means known in the art, including, not by limitation, use of adhesives or glues, welding, interference fit, and fasteners. Alternatively, one or more components of the cooling system 120 may be molded during manufacturing as an integral part of the cooling system 120.

Figure 2:
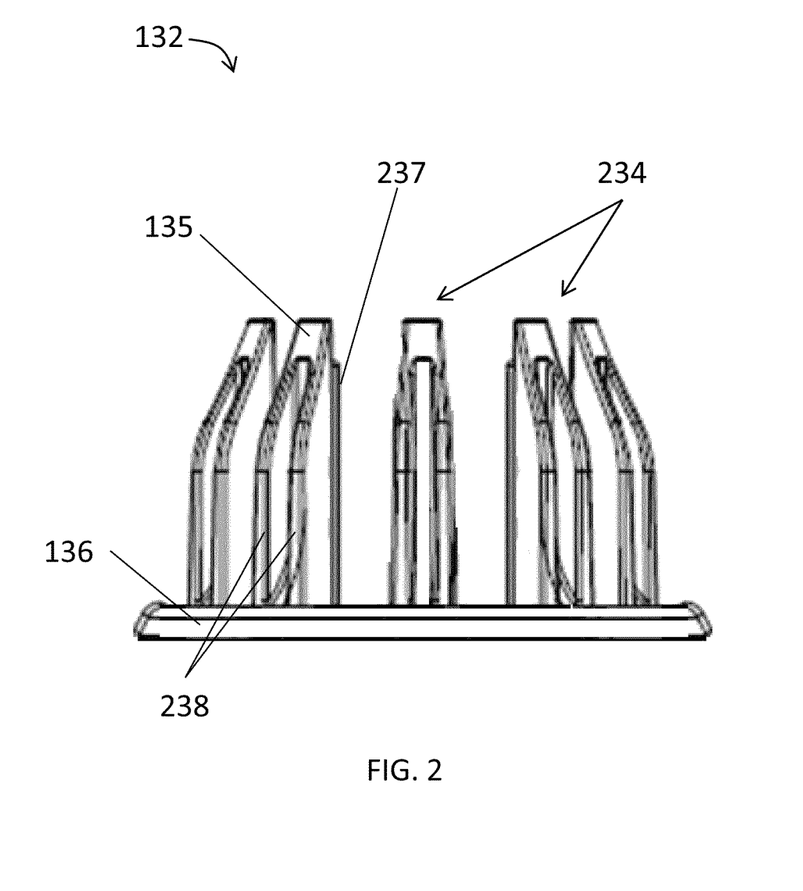
FIG. 2 is a front elevation view of a heat sink of the luminaire illustrated in FIG. 1A.

Referring now to FIG. 2, and continuing to refer to FIG. 1C, the modular cooling system 120 of the luminaire 100 according to an embodiment of the present invention may include one or more heat sinks 132, and portions of a heat sink 132 may include one or more heat sink segments 234. For example, and without limitation, each heat sink segment 234 may include one or more fin assemblies 135 that may, in turn, comprise one or more fins 238 that may be coupled with and positioned substantially perpendicular to a body portion 237. In this embodiment, the heat sink segments 234 may be configured to extend substantially the length of the heat sink 132 and to project radially outward therefrom in an elongate shape. Those skilled in the art will appreciate, however, that the present invention contemplates the use of heat sink segments 234 that extend any distance, and that the disclosed heat sink 132 that includes heat sink segments 234 that extend substantially the length thereof is not meant to be limiting in any way. The heat sink segments 234 may increase the surface area of the heat sink 132 and may permit thermal fluid flow between each fin 238, thereby enhancing the cooling capability of the heat sink 132. Additionally, multiple heat sink segments 234 may be identical in shape.

The heat sink 132 may be positioned adjacent to and in thermal communication with the light source 110, and may abut the base 142 of the modular cooling system 120. For example, and without limitation, the heat sink 132 may present a substantially flat heat-generating element contacting portion 136 with which the bottom surface of the light source 110 may come into thermal contact. The heat sink segments 234 of a heat sink 132 may be configured as projecting flanges (as illustrated in FIG. 2) that may be positioned opposite the surface of the contacting portion 136 with which the light source 110 makes contact. Accordingly, and as may be understood by those skilled in the art, the heat sink 132 advantageously may provide additional surface area for heat that may be produced by the light source 110 to be dissipated. The contacting portion 136 also may be configured to make mechanical contact with the base 142.

The contacting portion 136 may be configured into any shape, including a circle, ovoid, square, rectangle, triangle, or any other polygon. For example, and without limitation, the light source 110, the heat-generating element contacting portion 136, and a mounting portion of the base 142 may be of a substantially matching shape, such as a circle, an oval, a square, a rectangle, a triangle, a regular polygon, and an irregular polygon.

The heat sink 132 may be made by molding, casting, or stamping of a thermally conductive material. Materials may include, without limitation, thermoplastic, ceramics, porcelain, aluminum, aluminum alloys, metals, metal alloys, carbon allotropes, and composite materials. Additional information directed to the use of heat sinks for dissipating heat in an illumination apparatus is found in U.S. Pat. No. 7,922,356 titled Illumination Apparatus for Conducting and Dissipating Heat from a Light Source, and U.S. Pat. No. 7,824,075 titled Method and Apparatus for Cooling a Light Bulb, the entire contents of each of which are incorporated herein by reference.

Figure 1D:
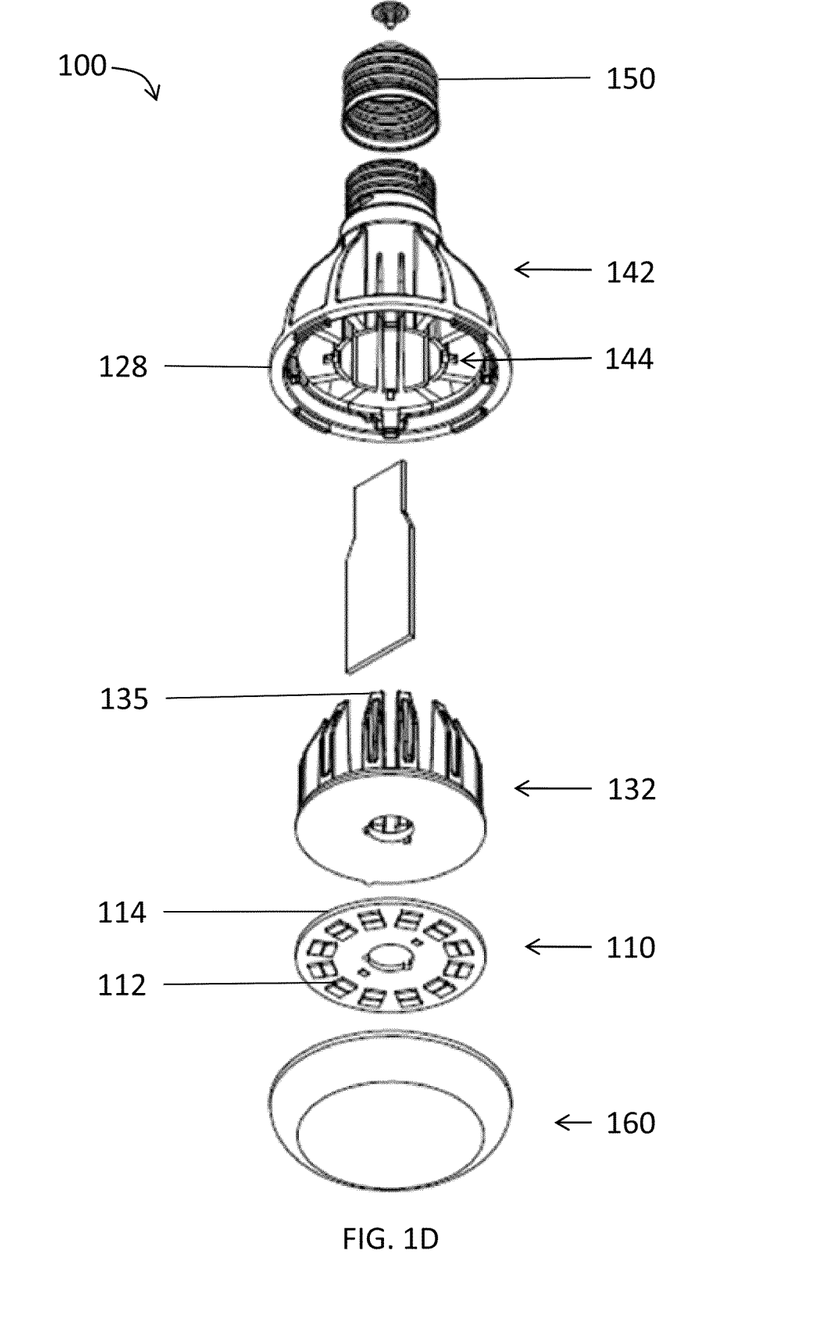
FIG. 1D is an exploded perspective view of the luminaire illustrated in FIG. 1A and showing the modular cooling system.

Referring now to FIG. 1D, the light source of the luminaire 100 according to an embodiment of the present invention is now discussed in greater detail. The light source 110 may include any device capable of emitting light. The light source 110 may, for example and without limitation, include light-emitting semiconductors, such as light-emitting diodes (LEDs), lasers, incandescent, halogens, arc-lighting devices, fluorescents, and any other digital light-emitting device known in the art. In some embodiments of the present invention, the light source 110 may be an LED package. As illustrated in FIG. 1D, for example, the light source 110 may be an LED package that may include an LED 112 and a circuit board 114. The circuit board 114 may be configured to be functionally coupled to the LED 112.

Referring again to FIG. 1C, the heat sink 132 may be positioned adjacent the light source 110 and may be thermally coupled to the light source 110. This thermal coupling may be accomplished by any method, including thermal adhesives, thermal pastes, thermal greases, thermal pads, and all other methods known in the art. Where a thermal adhesive, paste, or grease is used, the heat sink 132 may be connected to any part of the light source 110 as may effectively cause thermal transfer between the light source 110 and the heat sink 132. This largely may depend on the heat distribution within the light source 110. For example, the heat sink 132 may be thermally coupled to an LED 112, to the circuit board 114, or both.

For example, and without limitation, the circuit board 114 of the light source 110 may be sized to couple to the contacting portion 136 of the heat sink 132. In the luminaire 100 presented in an assembled position as illustrated, for example, in FIG. 1C, the contacting portion 136 of the heat sink 132 may be aligned with the light source 110, with the heat sink 132 simultaneously in contact with top portion of the base 142 of the modular cooling system 120. In such a configuration, the base 142 may substantially cover and obscure from view all but the heat sink segments 234 of the heat sink 132, thereby advantageously presenting an aesthetically pleasing appearance of the luminaire 100 without compromising the heat dissipation characteristics of the heat sink 132. For example, and without limitation, the assembled configuration of the heat sink 132 and the base 142 may present a generally frustoconical shape. The method of thermal coupling may be selected based on criteria including ease of application/installation, thermal conductivity, chemical stability, structural stability, and constraints placed by the luminaire 100.

Referring now to FIG. 2, the heat sink 132 of the luminaire 100, according to an embodiment of the present invention, is discussed in greater detail. The heat sink 132 may include a number of heat sink segments 234 configured to provide a larger surface area than may otherwise be provided by the surface of the light source 110. The configuration of the heat sink segments 234 may be according to the direction of the incorporated references. The illustrated embodiment shows the plurality of heat sink segments 234 being curved to advantageously provide additional surface area to provide additional dissipation of heat. More specifically, the width of each fin assembly 135 (measured from a proximal edge to a distal edge of a fin 238) may be greater at a mounting end nearer the contacting portion 136 than opposite the mounting end along the body portion 237. Those skilled in the art will readily appreciate, however, that the heat sink segments 234 of the heat sink 132 may be configured in any way while still accomplishing the many goals, features and advantages according to the present invention.

As illustrated in FIGS. 1C and 1D, the base 142 may include an attaching lip 128 that may be configured to receive an optic 160. More specifically, the optic 160 may interface with the attaching lip 128 to attach to and be carried by the modular cooling system 120. For example, and without limitation, the optic 160 may form an interference fit with the attaching lip 128, the interference fit providing sufficient strength to carry the optic 160 thereby. Optionally, the optic 160 may be attached to the attaching lip 128 through the use of an adhesive, glue, or any other attachment method known in the art.

The optic 160 may be configured to interact with light emitted by the light source 110 to refract incident light. Accordingly, the light source 110 may be disposed such that light emitted therefrom is incident upon the optic 160. The optic 160 may be formed in any shape to impart a desired refraction. In the present embodiment, the optic 160 has a generally concave geometry. Furthermore, the optic 160 may be formed of any material with transparent or translucent properties that comport with the desired refraction to be performed by the optic 160. Additionally, the optic 160 may be configured to generally diffuse light incident thereupon.

As shown in FIGS. 1C and 1D, the end of the base 142 substantially opposite the optic 160 may be configured to define an aperture 144. A circuit board receiving groove 129 may be presented as a notch in the base 142 positioned generally near the aperture 144. A circuit board 114 may be mounted in the circuit board receiving groove 129 to form a seal. For example, and without limitation, the interior volume 124 defined by the base 142 and the optic 160 may be isolated from the environment exterior to the lighting device 100 such that fluid from the environment is not able to gain entry to the interior volume 124 and intermix with the fluid contained therein. Hence, a fluid seal may be created about the interior volume 124.

Still referring to FIG. 1C, the interior volume 124 may be configured to have spatial characteristics permitting fluid flow within the interior volume 124. For example, and without limitation, the fluid flow within the interior volume 124 may cause the transfer of heat from the light source 110 through the contacting portion 136 of the heat sink 132, which may then transfer the heat to the heat sink segments 234 projecting through the base 142 and subsequently to the external environment. Accordingly, the spatial characteristics of the interior volume 124 directly correspond to the amount of heat that can be transported from the luminaire 100 to the external environment. Spatial characteristics that can be modified include total volume, fluid flow characteristics, interior surface area, and exterior surface area. For example, and without limitation, one or more surfaces of the base 142 may be textured or include grooves to increase the surface area of the base 142, thereby facilitating thermal transfer thereto. Moreover, thermal properties of the materials used to form the base 142 may be considered in forming the modular cooling system 120.

The aforementioned spatial characteristics may be modified to accommodate the heat generated by the light source 110 of the luminaire 100. For instance, the volume of the interior volume 124 may be directly proportional to the thermal output of the luminaire 100. Similarly, a surface area of some part of the modular cooling system 120 may be proportional to the thermal output of the luminaire 100. In any case, the interior volume 124 may be configured to maintain the temperature of the luminaire 100 at thermal equilibrium or within a target temperature range.

Figure 3A:
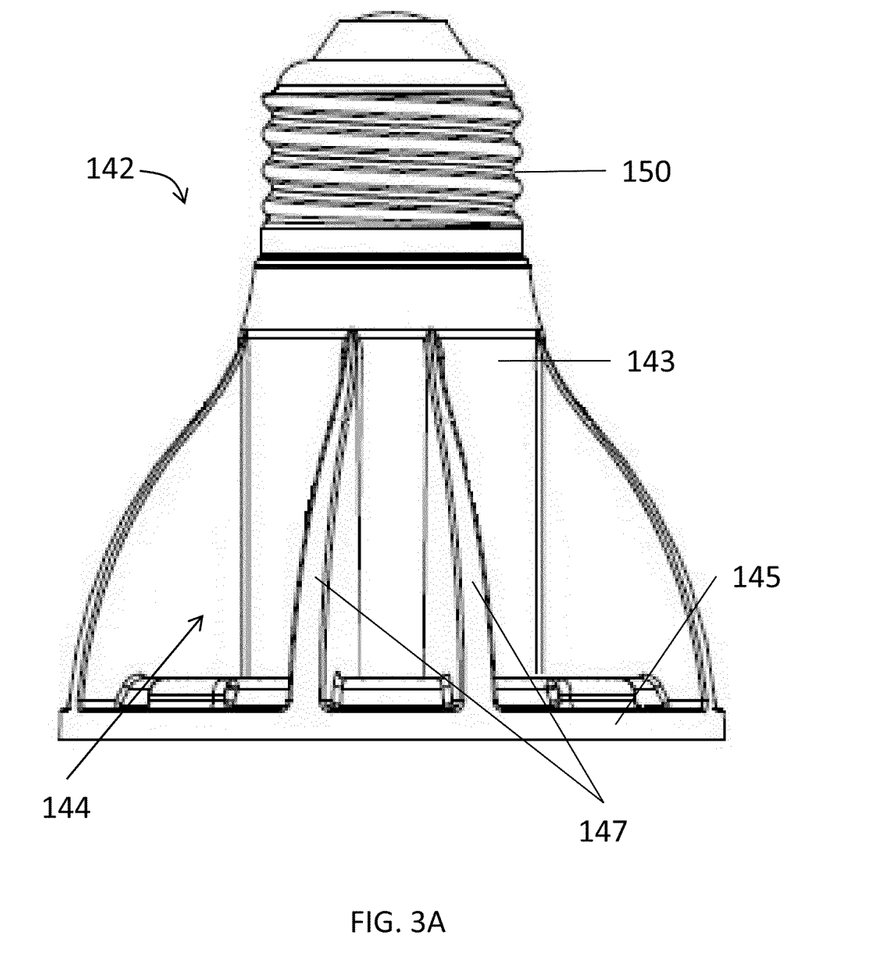
FIG. 3A is a front elevation view of a base of the luminaire illustrated in FIG. 1A.
Figure 3B:
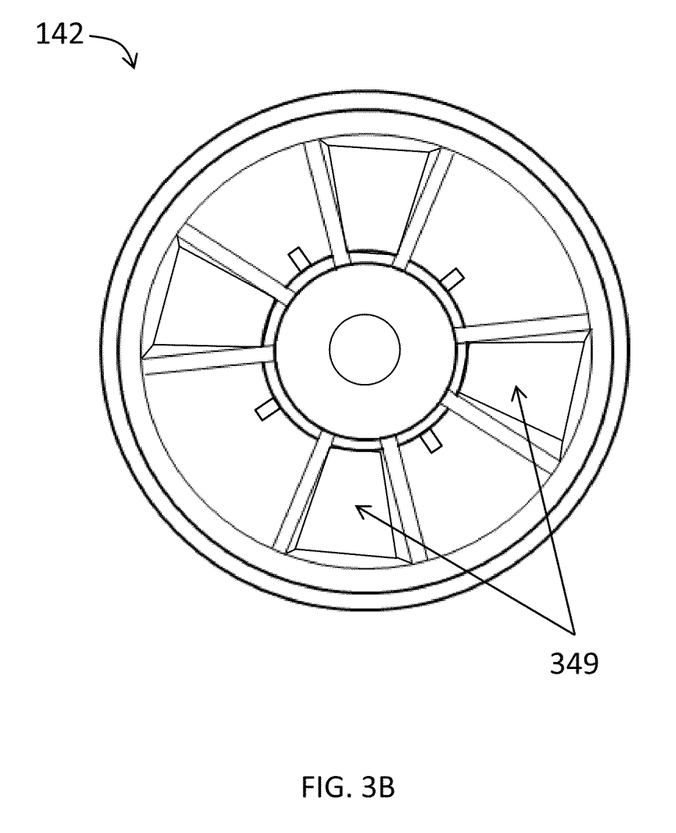
FIG. 3B is a top plan view of the base of the luminaire illustrated in FIG. 3A.

Referring now to FIGS. 3A and 3B, the base 142 of the luminaire 100, according to an embodiment of the present invention, is discussed in greater detail. The base 142 of the luminaire 100 that includes a modular cooling system 120 may include a medial portion 143 comprising a walled core and a plurality of fin guards 147, and a top portion 145 comprising a head. The base 142 may be constructed of a lightweight, thermal insulating material such as inorganic material, organic foam material, polyurethane material, polystyrene material, glass fibre material, aerogel material, and microporous material.

For example, and without limitation, the walled core of the medial portion 143 of the base 142 may be formed into any tubular shape, including a circle, ovoid, square, rectangle, triangle, or any other polygon. Referring to the embodiment of the luminaire 100 shown in FIG. 1C, the walled core of the medial portion 143 may define a substantially hollow interior to form a circuitry chamber 148. The circuitry chamber 148 may be configured to contain a power supply and electronic control devices (not shown) within the walled core of the medial portion 143 of the modular cooling system 120. The circuitry chamber 148 may present a cylinder of sufficient diameter to permit wires to pass therethrough from the light source 110 to the Edison connector 150 positioned adjacent a bottom portion of the base 142. Those skilled in the art will appreciate that although an Edison connector 150 is illustrated as being modular into the base 142 of the lighting device 100, the electrical connector for the lighting device may be provided by any type of connector that is suitable for connecting the lighting device to a power source. In order to maintain a fluid seal between the circuitry chamber 148 and the environment external to the lighting device 100, the walled core of the medial portion 143 may further include a sealing member. The sealing member may include any device or material that can provide a fluid seal as described above. For example, and without limitation, the sealing member may form a fluid seal between the walled core of the medial portion 143 and the Edison connector 150. Other embodiments may have the circuitry chamber disposed on other parts of the modular cooling system 120.

Continuing to refer to FIGS. 3A and 3B, and referring additionally to FIGS. 1C and 1D, the head 145 of the base 142 may be positioned to substantially encase the contacting portion 136 of a heat sink 132 between the optic 160 and the base 142. The head 145 may have an aperture 144 adjacent the portion of the heat sink 132 that is in contact with the light source 110 to permit fluid to flow unimpeded from the interior volume 124 through the circuit board 114 to the heat sink 132. The head 145 may also have one or more passageways 349 that allow heat sink segments 234 of a heat sink 132 to project radially through the head 145 to expose the heat sink segments 234 to the environment external to the lighting device 100.

Continuing to refer to FIG. 3A, fin guards 147 may connect to and mechanically support the walled core of the medial portion 143. Opposing pairs of fin guards 147 may be positioned to form a channel within which a heat sink segment 234 of a heat sink 132 may be matedly positioned, such that the insulating properties of the fin guards 147 may direct fluid flow outward from the lighting device 100 and away from the head 145 of the base 142. For example, and without limitation, the fin guards 147 disposed between two heat sink segments 234 may present an enclosable region 144 as illustrated in FIGS. 1A and 3A. In one embodiment, spacing of the heat sink segments 234 of heat sink 132 may allow molding of the base 142 such that one or more resultant enclosable regions 144 may create heat-protected spaces for receiving auxiliary components such as, for example and without limitation, a radio board (not shown). Such configuration and use of fin guards 147 may position heat-sensitive auxiliary components away from the unfavorable heat dissipation characteristics of the base of the lighting device 100, and more towards the open-air environment near the head 145 of the base 142, thereby advantageously producing favorable effects on the functionality of such components (for example, the radio transmission effects of a radio board).

For example, and without limitation, the medial portion 143 may include at least one auxiliary heat sink positioned between the medial portion of the base 142 and an adjacent heat sink segment 234. Each auxiliary heat sink may be constructed of a thermally conductive material such as thermoplastic, ceramics, porcelain, aluminum, aluminum alloys, metals, metal alloys, carbon allotropes, and composite materials. Each auxiliary heat sink may be in thermal communication with the modular heat sink 132 to define a total heat sink surface area is proportional to a thermal output of the heat-generating element 110.

It is appreciated that the shape and configuration of each of the base 142, the optic 160, and the light source 110 may vary to conform to a standard size for light bulbs. Light bulb standards to which the aforementioned elements may conform to include, but are not limited to, A series bulbs, B series bulbs, C series bulbs, CA series bulbs, S series bulbs, F series bulbs, RP, MB, and BT series bulbs, R series bulbs, MR series bulbs, PS series bulbs, AR series bulbs, ALR series bulbs, BR series bulbs, PAR series bulbs, T series bulbs, G series bulbs, BT series bulbs, E series bulbs, and ED series bulbs. In some embodiments of the invention, a heat sink 132 of a single configuration may be configured to attach to, be carried by, and thermally couple with a base 142, an optic 160, and a light source 110 that conforms to the above standards.

Figure 4:
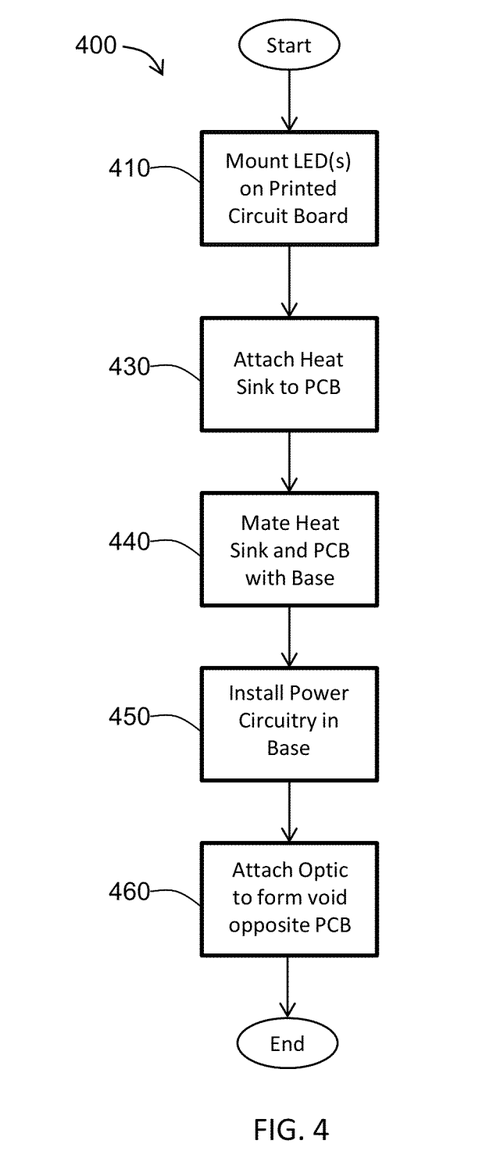
FIG. 4 is a flow chart detailing a method of manufacturing modular cooling system as used in connection with a luminaire according to an embodiment of the present invention.

Referring to FIG. 4 and additionally to FIGS. 1C, 1D, 3A, and 3B, a method aspect of the present invention is now described in greater detail. The method according to the present invention, and as illustrated in the flowchart 400 of FIG. 4, is directed to manufacturing a luminaire 100 that dissipates heat using the modular cooling system 120 of the present invention. The method starts at Block 410 where a light source 110 may be formed by mounting LEDs 112 on a circuit board 114. At Block 430, a heat sink 132 may be positioned such that the contacting portion 136 of the heat sink 132 may contact the circuit board 114. Then the portion of the heat sink 132 opposite the light source 110 may be mated with the base 142 (Block 440). For example, and without limitation, each of the heat sink segments 234 may be positioned to pass through a respective passageway 349 near the head 145 of the base 142 such that the body portion 237 of each fin assembly 135 of the heat sink 132 may contact the exterior of the walled core of the medial portion 143 and may be matingly positioned in the channel defined between opposing fin guards 147. The head 145 of the base 142 may be positioned to contact the contacting portion 136 of the heat sink 132 opposite the circuit board 114 such that the circuit board receiving groove 129 may be used to mate the light source 110 with the body 142. At Block 450, a power supply and other electronic circuitry (not shown) may be installed into the circuitry chamber 148 of the walled core of the medial portion 143. The method is ended at Block 460, where an optic 160 may be attached to the lighting device 100 at the attaching lip 128.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

What is claimed is:

1. A luminaire comprising:
a base having a bottom portion, a medial portion, and a top portion, the top portion of the base having a plurality of heat sink segment receiving passageways formed therein and the medial portion of the base having a substantially cylindrical walled core inside the base comprising an interior and an exterior;
a heat sink modularly connected to the base and comprising:
a heat-generating element contacting portion having a top surface and a bottom surface,
a plurality of heat sink segments connected to and extending outwardly from the bottom surface of the heat-generating element contacting portion, wherein each of the plurality of heat sink segments comprises at least one fin assembly; and
a heat-generating element in thermal communication with the modular heat sink;
wherein the plurality of heat sink segments pass through the respective plurality of heat sink segment receiving passageways so that the at least one fin assembly of each of the plurality of heat sink segments matingly engages the medial portion of the base such that a proximal edge of the at least one fin assembly of each of the plurality of heat sink segments is positioned adjacent to the exterior of the substantially cylindrical walled core inside the base and such that a distal edge of each of the at least one fin assembly of each of the plurality of heat sink segments is substantially exposed outside the base.

2. The luminaire according to claim 1 wherein the at least one fin assembly of each of the plurality of heat sink segments comprises a body portion and at least one fin that extends outwardly from the body portion, wherein the at least one fin assembly has an elongate shape.

3. The luminaire according to claim 2 wherein configuration of the body portion and the at least one fin that extends outwardly therefrom defines at least one void between at least one pair of fins and the body portion.

4. The luminaire according to claim 1 wherein the heat-generating element contacting portion comprises at least one thermally conductive material selected from the group consisting of thermoplastic, ceramic, porcelain, aluminum, and aluminum alloys; and wherein each of the plurality of heat sink segments comprises at least one thermally conductive material selected from the group consisting of thermoplastic, ceramic, porcelain, aluminum, and aluminum alloys.

5. The luminaire according to claim 1 wherein the heat-generating element comprises one or more light emitting diodes (LEDs).

6. The luminaire according to claim 5 wherein the heat-generating element contacting portion includes a substantially central aperture through which an electrical connector passes to form an electrical connection with the one or more LEDs.

7. The luminaire according to claim 1 further comprising a power supply carried within the interior of the substantially cylindrical walled core.

8. The luminaire according to claim 1 wherein the medial portion of the base includes at least one pair of fin guards that forms a channel within which each of the plurality of heat sink segments is positioned.

9. The luminaire according to claim 1 wherein the base comprises at least one auxiliary heat sink; wherein the at least one auxiliary heat sink comprises a thermally conductive material, is fixedly attached to a portion of the base, and is in thermal communication with the modular heat sink.

10. The luminaire according to claim 9 wherein a total heat sink surface area is proportional to a thermal output of the heat-generating element, the total sink surface area being defined as a combined surface area of the modular heat sink and the at least one auxiliary heat sink.

11. A method for fabricating a luminaire comprising:
   forming a base by performing steps including fabricating the base to include a top portion comprising a plurality of receiving passageways formed therein, and a medial portion comprising a substantially cylindrical walled core inside the base that includes an interior and an exterior; and
   forming a heat sink by performing steps including
      fabricating a heat-generating element contacting portion having a top surface and a bottom surface,
      constructing a plurality of heat sink segments each having at least one fin assembly including a body portion and at least one fin that extends outwardly from the body portion, wherein the at least one fin assembly has an elongate shape, and
      assembling the plurality of heat sink segments to connect to and extend outwardly from the bottom surface of the heat-generating element contacting portion; and
   positioning the heat sink in thermal communication with the base by performing steps including
      passing the plurality of heat sink segments through the respective plurality of receiving passageways formed in the top portion of the base, and
      matingly engaging the at least one fin assembly of each of the plurality of heat sink segments with the medial portion of the base such that a proximal edge of the at least one fin assembly of each of the plurality of heat sink segments is positioned adjacent to the exterior of the substantially cylindrical walled core inside the base and such that a distal edge of each of the at least one fin assembly of each of the plurality of heat sink segments is substantially exposed outside the base.

12. A method according to claim 11 wherein constructing each of the plurality of heat sink segments further comprises configuring the at least one fin assembly to define a void between the body portion and at least one pair of fins.

13. The method according to claim 11 wherein fabricating the heat-generating element contacting portion comprises fabricating from at least one thermally conductive material selected from the group consisting of thermoplastic, ceramic, porcelain, aluminum, and aluminum alloys; and wherein constructing each of the plurality of heat sink segments comprises constructing from at least one thermally conductive material selected from the group consisting of thermoplastic, ceramic, porcelain, aluminum, and aluminum alloys.

14. The method according to claim 11 wherein assembling the plurality of heat sink segments to connect to and extend outwardly from the bottom surface of the heat-generating element contacting portion further comprises fixedly connecting the plurality of heat sink segments with the bottom surface of the heat-generating element contacting portion.

15. The method according to claim 11 wherein assembling the plurality of heat sink segments to connect to and extend outwardly from the bottom surface of the heat-generating element contacting portion further comprises integrally molding the plurality of heat sink segments with the bottom surface of the heat-generating element contacting portion.

16. The method according to claim 11 wherein assembling the plurality of heat sink segments to connect to and extend outwardly from the bottom surface of the heat-generating element contacting portion further comprises:
   positioning each of the plurality of heat sink segments such that the distal edge of the at least one fin assembly is disposed substantially along a circumference of the heat-generating element contacting portion; and
   sequentially spacing the plurality of heat sink segments in relation to one another along a circumference of the heat-generating element contacting portion.

17. The method according to claim 11 wherein at least two of the plurality of heat sink segments are identical in shape.

* * * * *